United States Patent
Barak

[11] Patent Number: 5,833,338
[45] Date of Patent: Nov. 10, 1998

[54] PROJECTOR

[75] Inventor: Shlomo Barak, Rishon Le Zion, Israel

[73] Assignee: Unic View Ltd., Netanya, Israel

[21] Appl. No.: 543,219

[22] Filed: Oct. 13, 1995

[30] Foreign Application Priority Data

May 19, 1995 [IL] Israel ......................................... 113796

[51] Int. Cl.⁶ ................................................ G03B 21/14
[52] U.S. Cl. ...................... 353/20; 353/33; 349/9
[58] Field of Search .................... 353/20, 8, 31, 353/33, 34, 37, 81, 84; 349/9, 8

[56] References Cited

U.S. PATENT DOCUMENTS

| | | | |
|---|---|---|---|
| 4,345,258 | 8/1982 | Tsai et al. | 353/20 |
| 4,911,547 | 3/1990 | Ledebuhr | 353/34 |
| 5,121,983 | 6/1992 | Lee | 353/20 |
| 5,172,254 | 12/1992 | Atasashi et al. | 353/20 |
| 5,181,054 | 1/1993 | Nicolas et al. | 353/20 |
| 5,235,444 | 8/1993 | de Vaan | 353/34 |
| 5,272,496 | 12/1993 | Nicolas et al. | 353/20 |
| 5,299,036 | 3/1994 | Nicolas et al. | 353/34 |
| 5,389,982 | 2/1995 | Lee | 353/20 |
| 5,515,202 | 5/1996 | Wright | 353/34 |
| 5,626,408 | 5/1997 | Heynderickx et al. | 353/20 |

FOREIGN PATENT DOCUMENTS

631434 A1   12/1994   European Pat. Off. .

OTHER PUBLICATIONS

Rho, B.G., et al., A new LCD projector system with higher brightness, *ASIA DiSPLAY '95*, pp. 83–85.
Spindler & Hoyer, Beamsplitter Cubes (brochure).
Melles Griot, Broadband polarizing cube beamsplitters (brochure).
Glan Taylor, Polarizing Components—crystal polarizers (brochure).

Primary Examiner—William Dowling
Attorney, Agent, or Firm—Ladas & Parry

[57] ABSTRACT

A projector including a non-polarized light source, a polarizing beam-splitter receiving light from the non-polarized light source and a selectably actuable polarization rotating light valve having light polarized in one sense from the polarizing beam-splitter impinging thereon from a first direction and having light polarized in an opposite sense from the polarizing beam-splitter impinging thereon from a second direction.

7 Claims, 16 Drawing Sheets

PROJECTOR

FIELD OF THE INVENTION

The present invention relates to projectors.

BACKGROUND OF THE INVENTION

Various types of video and computer generated information projectors are known. These include, for example, the SharpVision product line commercially available from Sharp Corporation of Japan. Conventional projectors of this type have achieved significant market penetration but suffer from various disadvantages and limitations.

One of the significant limitations in liquid crystal panel projectors lies in the relatively limited amount of light that can be projected. It may be appreciated that the amount of light that can be transmitted through a conventional color liquid crystal panel assembly is limited by the amount of light that can be absorbed by the liquid crystal panel without degradation of its performance and permanent damage thereto inter alia mainly due to overheating. Accordingly the brightness of projected images produced by such projectors is correspondingly limited.

SUMMARY OF THE INVENTION

The present invention seeks to provide an improved projector which is highly efficient in light utilization.

There is thus provided in accordance with a preferred embodiment of the present invention a projector comprising:
a non-polarized light source;
a polarizing beam splitter receiving light from the non-polarized light source; and
a selectably actuable polarization rotating light valve having light polarized in one sense from the polarizing beam-splitter impinging thereon from a first direction and having light polarized in an opposite sense from the polarizing beam-splitter impinging thereon from a second direction.

In accordance with a preferred embodiment of the present invention, when the light valve is not actuated, the light polarized in both the one sense and the opposite sense passes therethrough without changes in polarization.

Further in accordance with a preferred embodiment of the present invention, when the light valve is actuated, the light polarized in both the one sense and the opposite sense passes therethrough with changes in polarization to an extent determined by the actuation. The range of rotation produced by the light valve is from 0 to 90 degrees.

Additionally in accordance with a preferred embodiment of the invention, when the light valve is not actuated all of the light is directed to an objective lens.

Still further in accordance with a preferred embodiment of the invention, when the light valve is actuated to cause a 90 degree rotation of the polarization, all of the light is directed back to the light source.

In this manner, very small light losses and heat dissipation is encountered at the light valve, enabling relatively high brightness to be achieved using relatively low power light sources.

Preferably, the light valve is a liquid crystal light valve from which polarization plates have been removed. Preferably the light valve comprises a multiplicity of independently electrically actuable regions, corresponding to pixels.

In accordance with a preferred embodiment of the present invention, the polarizing beam splitter comprises a pair of prisms which are cemented together with multiple dielectric layers therebetween. In accordance with another preferred embodiment of the present invention, the beam splitter is a crystallizing polarizing beam splitter. Other suitable types of polarizing beam splitters may also be employed.

The projector may be monochromatic or may operate in color. In order to enhance light utilization efficiency when the projector operates in color, preferably, the selectably polarization rotating light valve comprises:
a shutter assembly having a multiplicity of pixel light valves; and
a color separator disposed on each side of the shutter assembly, intermediate the light source and the shutter assembly and spaced therefrom and providing a plurality of spatially separated differently colored light beams;
wherein the plurality of spatially separated differently colored light beams are in predetermined registration with the multiplicity of pixel light valves.

Alternatively a color projector may employ three separate monochromatic light sources, polarizing beam splitters and selectably actuable polarization rotating light valves, whose outputs are combined into a single image.

It will be appreciated that the present invention provides greatly enhanced light utilization efficiency, which may reach one order of magnitude, as compared with prior art devices.

BRIEF DESCRIPTION OF THE DRAWINGS

The present invention will be understood and appreciated more fully from the following detailed description, taken in conjunction with the drawings in which.

DETAILED DESCRIPTION OF A PREFERRED EMBODIMENT

Figure 1:
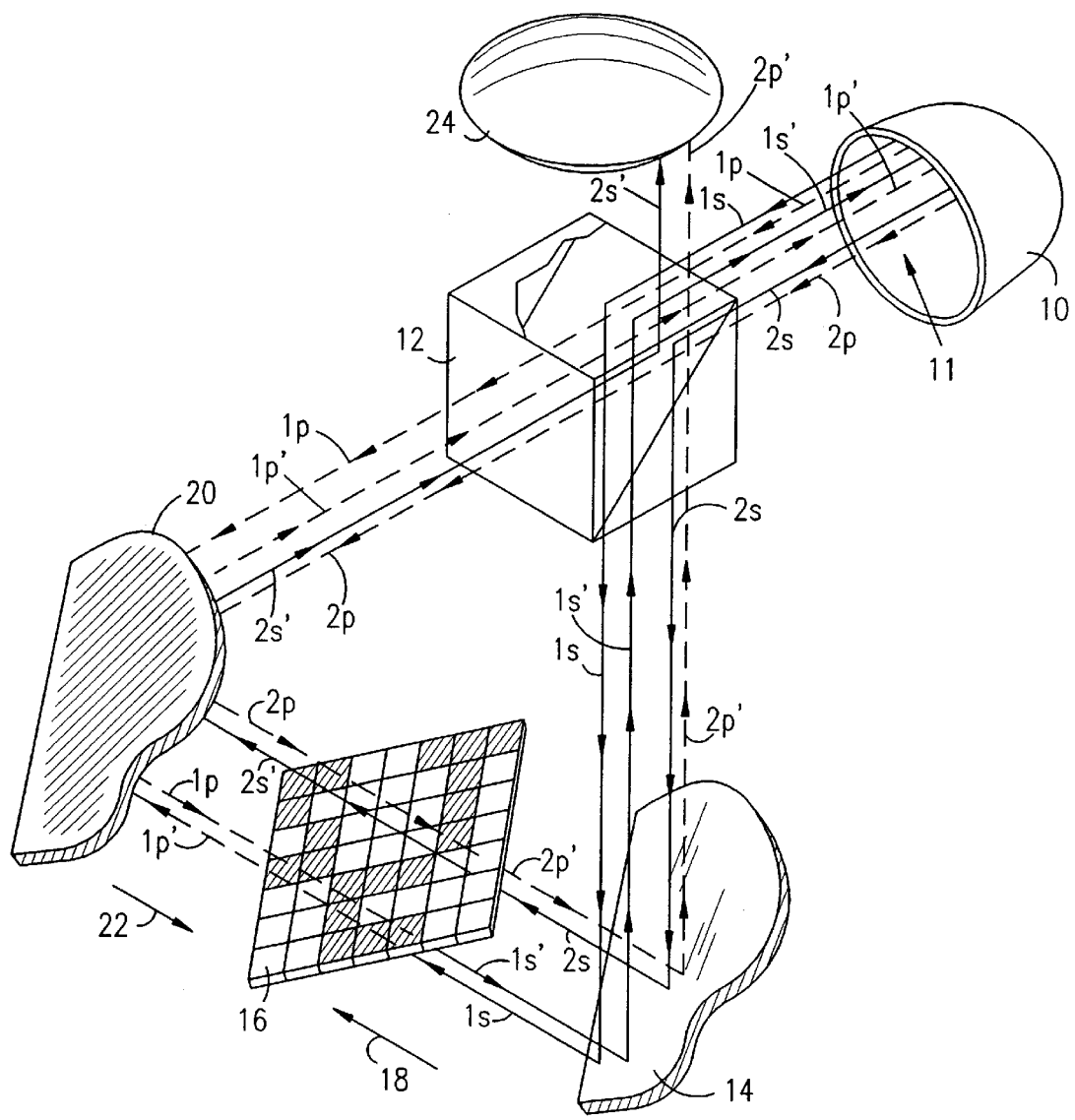
FIG. 1 is a simplified schematic illustration of a projector constructed and operative in accordance with a preferred embodiment of the present invention.

Reference is now made to FIG. 1, which is a simplified schematic illustration of a projector constructed and operative in accordance with a preferred embodiment of the present invention. The projector of the present invention comprises a light source 10, such as a metal halide arc lamp manufactured by Osram or Philips combined with a suitable reflector, which outputs a generally collimated beam of light 11 to a polarizing beam splitter 12. The polarizing beam splitter may be any suitable polarizing beam splitter and may be similar to, for example, a broadband polarizing cube beam splitter, commercially available from Melles Griot or a crystal polarizer beam splitter, commercially available from Spindler & Hoyer.

Although a prism-type beam splitter is illustrated throughout, it is appreciated that a planar type beam splitter is equally applicable.

Figure 2:
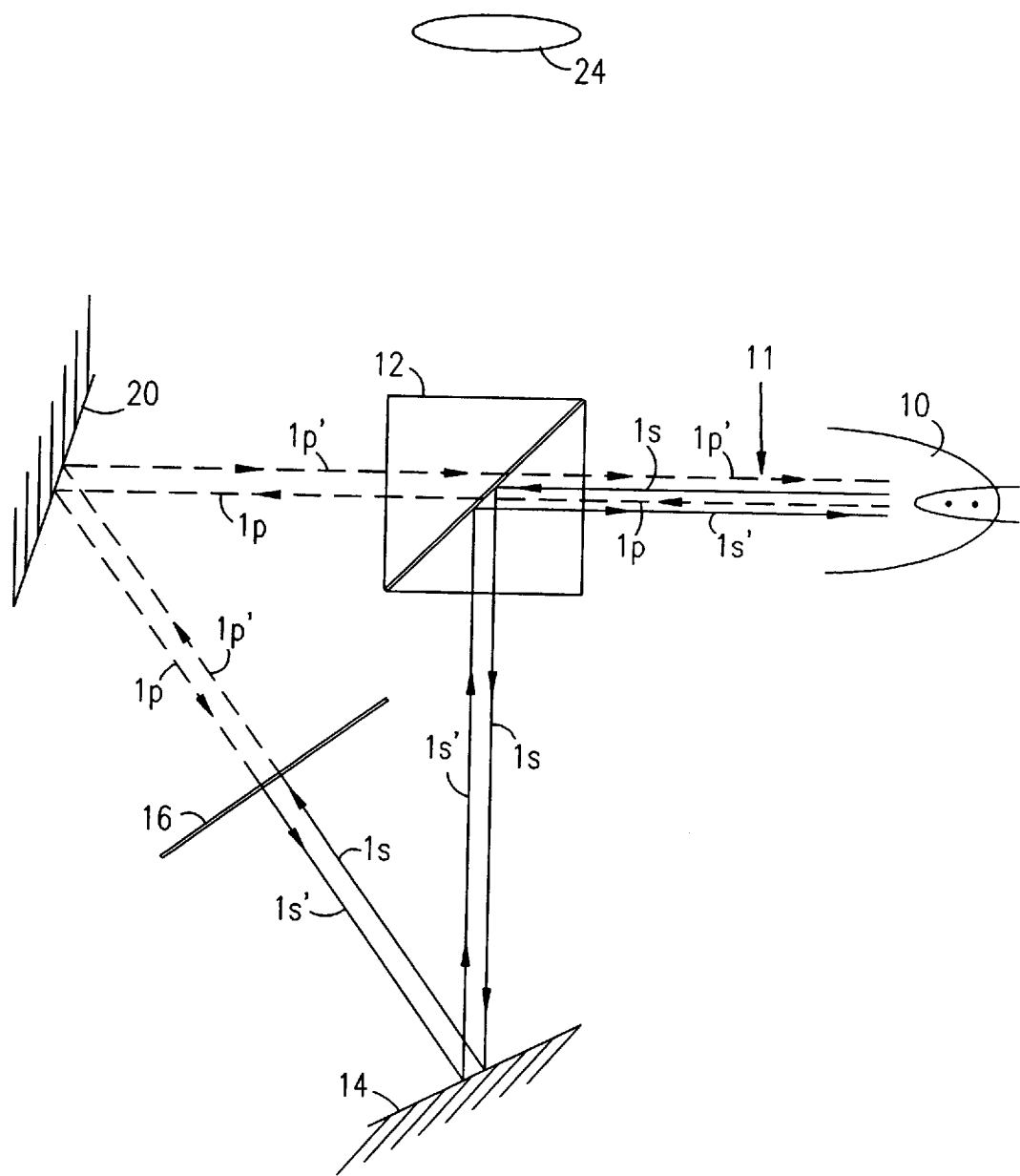
FIGS. 2 and 3 are simplified schematic illustrations of the passage of two differently polarized components of one ray of light through part of a projector constructed and operative in accordance with a preferred embodiment of the present invention in respective first and second operative states.
Figure 3:
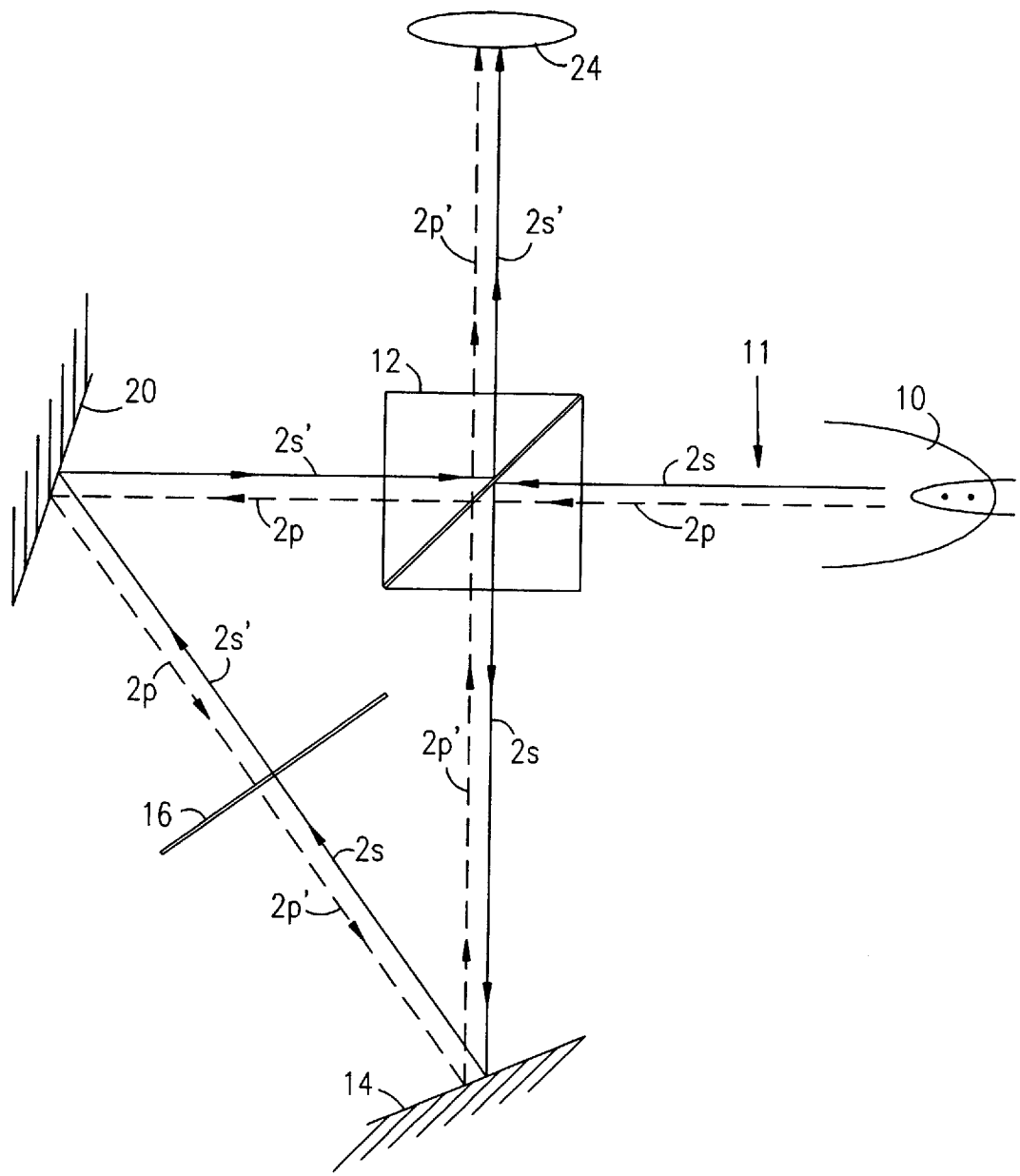

The operation of the apparatus of FIG. 1 may be best appreciated by a consideration of a number of individual differently polarized components of individual rays of light forming beam 11 together with a consideration of FIGS. 2 and 3, which show the passage of the differently polarized components of individual rays of light separately through respective actuated and non-actuated pixels of the light valve array.

A first polarized component of a ray of light, represented by a solid line, and labeled 1s, is reflected by the polarizing beam splitter 12 via a mirror 14 to impinge upon a light valve array 16 in a first direction, indicated by arrows 18. A second polarized component of the same ray of light, polarized orthogonally to the first polarized component of light represented by a dashed line and labeled 1p, passes through beam splitter 12 and is reflected from a mirror 20 to impinge upon light valve array 16 in a second direction, indicated by arrows 22.

The light valve array 16 may be any suitable light valve array and is preferably a liquid crystal light valve array from which the polarization plates thereof have been removed. The liquid crystal light valve array may be monochromatic but is preferably a color array. A preferred embodiment of a color liquid crystal light valve array is described and claimed in applicant/assignee's Published European Patent Application 0631434.

If it is desired to employ commercially available off-the-shelf liquid crystal light valves which are normally aligned at 45 degrees with respect to their frames, it is necessary to rotate such liquid crystal light valves in their respective planes about the optical axis of the system by 45 degrees, such that the resulting polarization will coincide with either the s or the p polarized beam components. It is appreciated that using conventional technology liquid crystal light valves which are aligned parallel to the rows or columns therein may be used for the purposes of the present invention.

When commercially available off-the-shelf liquid crystal light valves are employed, they are operative to transmit light in the absence of the application of an electrical voltage thereto. This is known as operation in a normally white mode, as distinguished from operation in a normally black mode, when the light valves are opaque in the absence of the application of an electrical voltage thereto.

In the apparatus of the present invention, liquid crystal light valves which are designed to operate in the normally white mode would have the opposite effect and block transmission of light. Accordingly, conventional off-the-shelf liquid crystal light valves should be operated in an electrically inverse mode or an additional 90 degree polarization rotator should be employed.

Each pixel in the liquid crystal light valve array may be independently electrically controlled to selectably rotate the polarization of light passing therethrough. The selectable polarization causes rotation of light passing therethrough in a range of 0 to 90 degrees. For the purpose of simplicity in illustration and explanation, only two operative states of the light valve array are here considered, namely 0 degrees rotation and 90 degrees rotation, it being understood that grey scales may be expressed by intermediate amounts of rotation.

Returning to a consideration of FIG. 1 and of components 1s and 1p, it is seen that they both impinge on a pixel which is hatched to indicate 90 degree rotation. Thus the 1s component is converted at the light valve to a 1p' component and the 1p component is converted to a 1s' component. The resulting 1p' component is reflected by mirror 20 to pass through beam splitter 12 to the light source 10. The resulting 1s' component is reflected by mirror 14 and is reflected at beam splitter 12 to the light source 10. Thus it is seen that both differently polarized components of a beam which impinges on an actuated pixel of the light valve array 16 are eventually reflected back to the light source.

Turning to a consideration of a second light ray having mutually orthogonally polarized components 2s and 2p, it is seen that first polarized component 2s, is reflected by the polarizing beam splitter 12 via mirror 14 to impinge upon light valve array 16 in the first direction, indicated by arrows 18. The second polarized component of the same ray of light, polarized orthogonally to the first polarized component of light represented by a dashed line and labeled 2p, passes through beam splitter 12 and is reflected from mirror 20 to impinge upon light valve array 16 in a second direction, indicated by arrows 22.

Both differently polarized components impinge on a pixel which is blank to indicate 0 degree rotation. Thus the 2s component is not converted at the light valve and remains a 2s' component and the 2p component is also not converted and remains a 2p' component. The 2p' component is reflected by mirror 14 to pass through beam splitter 12 to the objective lens 24. The 2s' component is reflected by mirror 20 and is reflected at beam splitter 12 to the objective lens 24. Thus it is seen that both differently polarized components of a beam which impinged on an non-actuated pixel of the light valve array 16 are eventually directed to the objective lens. It is noted that the light valve array 16 should be placed optically equidistant from the objective lens along the light paths of both the p and the s components, such that the objective lens 24 equally images both sides of the light valve array.

It may be appreciated that in the arrangement of the present invention, depending on the image defined by the polarization states of the various pixels the light is directed either through an objective lens 24 or reflected back to the light source 10, where it may be used to heat the plasma therein, or alternatively be redirected through the projector. Accordingly the heat accumulation at the light valve array due to light absorption thereat is minimized.

It is a particular feature of the present invention that light of different polarization impinges on the light valve array 16 simultaneously in opposite directions. It is also a particular feature of the present invention that the light impinges upon through the beam splitter twice in every case. These features enable light of both polarizations to contribute to the brightness of an illuminated pixel.

The embodiments described hereinabove may be either monochromatic or color depending on whether color filtration is provided.

Figure 4:
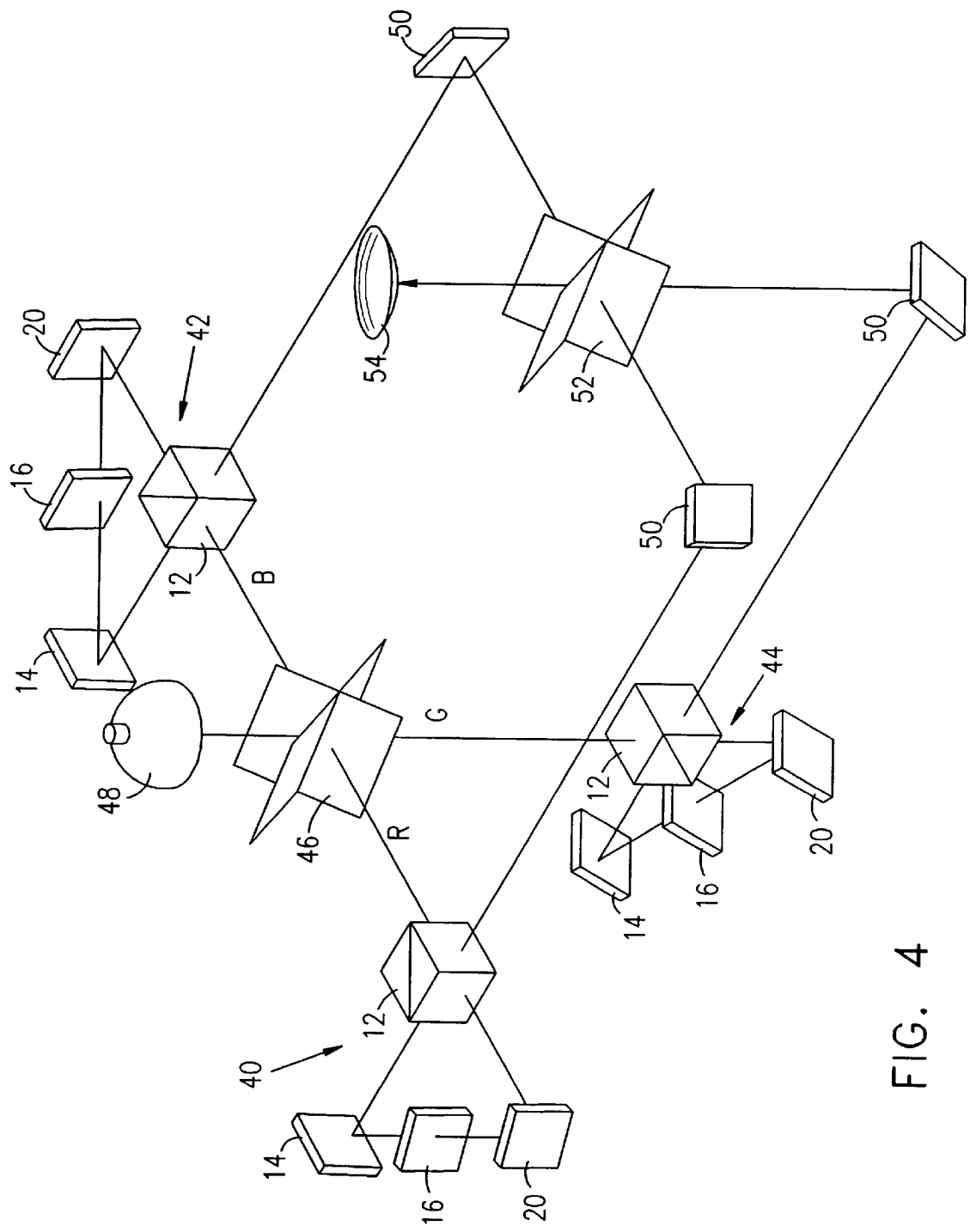
FIG. 4 is a simplified schematic illustration of a color projector employing three monochromatic subassemblies in accordance with an alternative embodiment of the present invention.

Reference is now made to FIG. 4, which illustrates an embodiment of a color projector. Here three generally identical monochromatic color subassemblies, labeled respectively 40, 42 and 44 and each including a polarizing beam splitter 12 and a monochromatic light valve array 16, receive light via dichroic beam splitters 45 from a polychromatic light source 48 which may be identical with light source 10 described hereinabove.

Each of the subassemblies may be constructed and operative as described hereinabove with reference to FIGS. 1–3. The outputs of light downstream of the light valve arrays 16 pass through the respective beam splitters 12 of each subassembly and are reflected by mirrors 50 so as to direct the light via dichroic beam combiners 52, and through a single objective lens 54.

Figure 5:
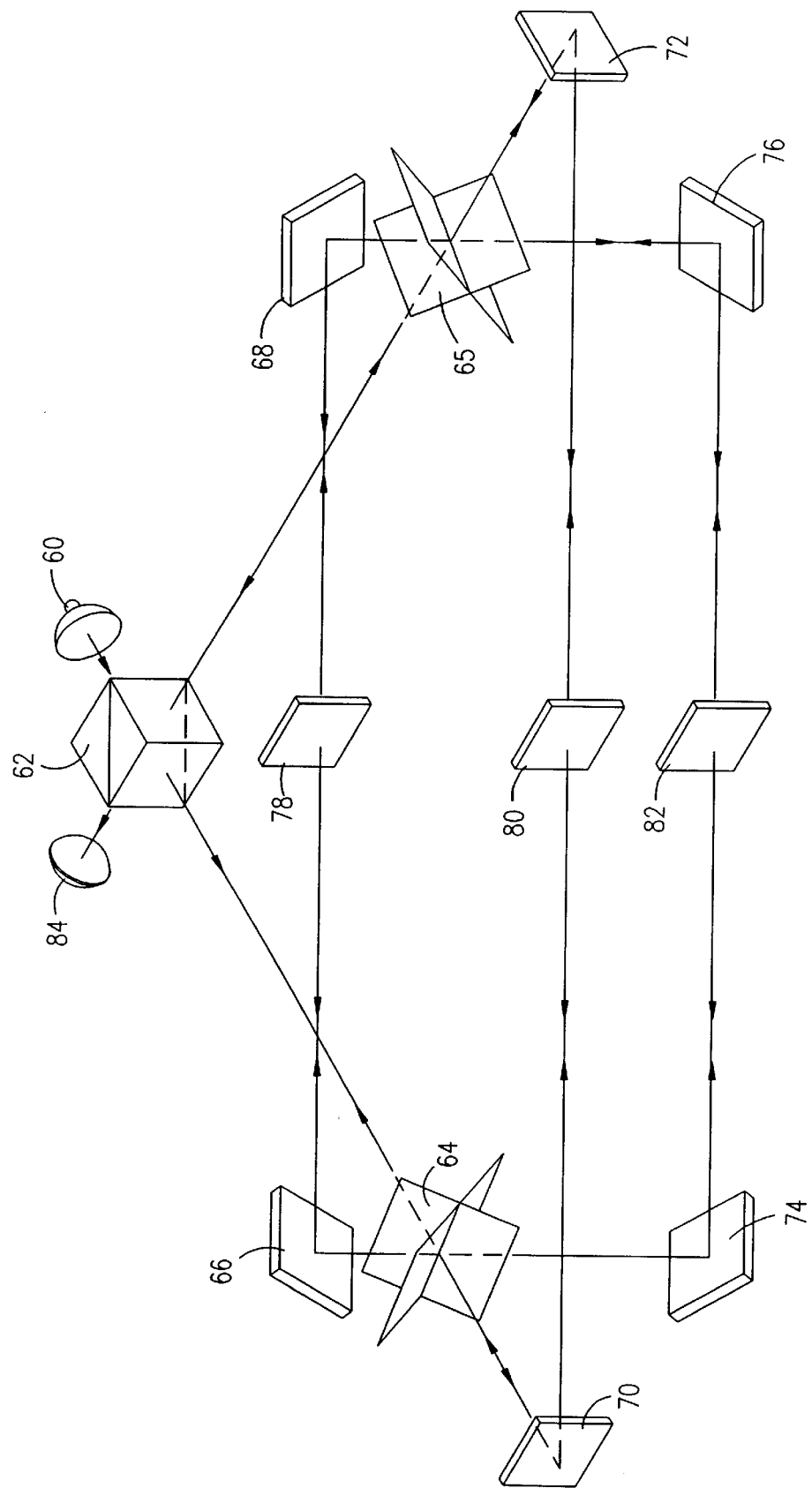
FIG. 5 is a simplified schematic illustration of a color projector employing three monochromatic subassemblies in accordance with a further alternative embodiment of the present invention.

Reference is now made to FIG. 5, which illustrates a further alternative embodiment of a color projector. Here light from a light source 60 passes through a polarizing beam splitter 62. The resulting two mutually orthogonally polarized components of the light are directed to respective dichroic beam splitters 64 and 65.

The red, green and blue components are directed by respective mirror pairs 66, 68; 70, 72 and 74, 76 through three respective monochromatic light valve arrays 78, 80 and 82. Light which has passed through one of the three light valve arrays 78, 80 and 82 is recombined at beam splitter 62 and directed via an objective lens 84 to provide an image output.

Each of the subassemblies may be constructed and operative as described hereinabove with reference to FIGS. 1–3.

Figure 6:
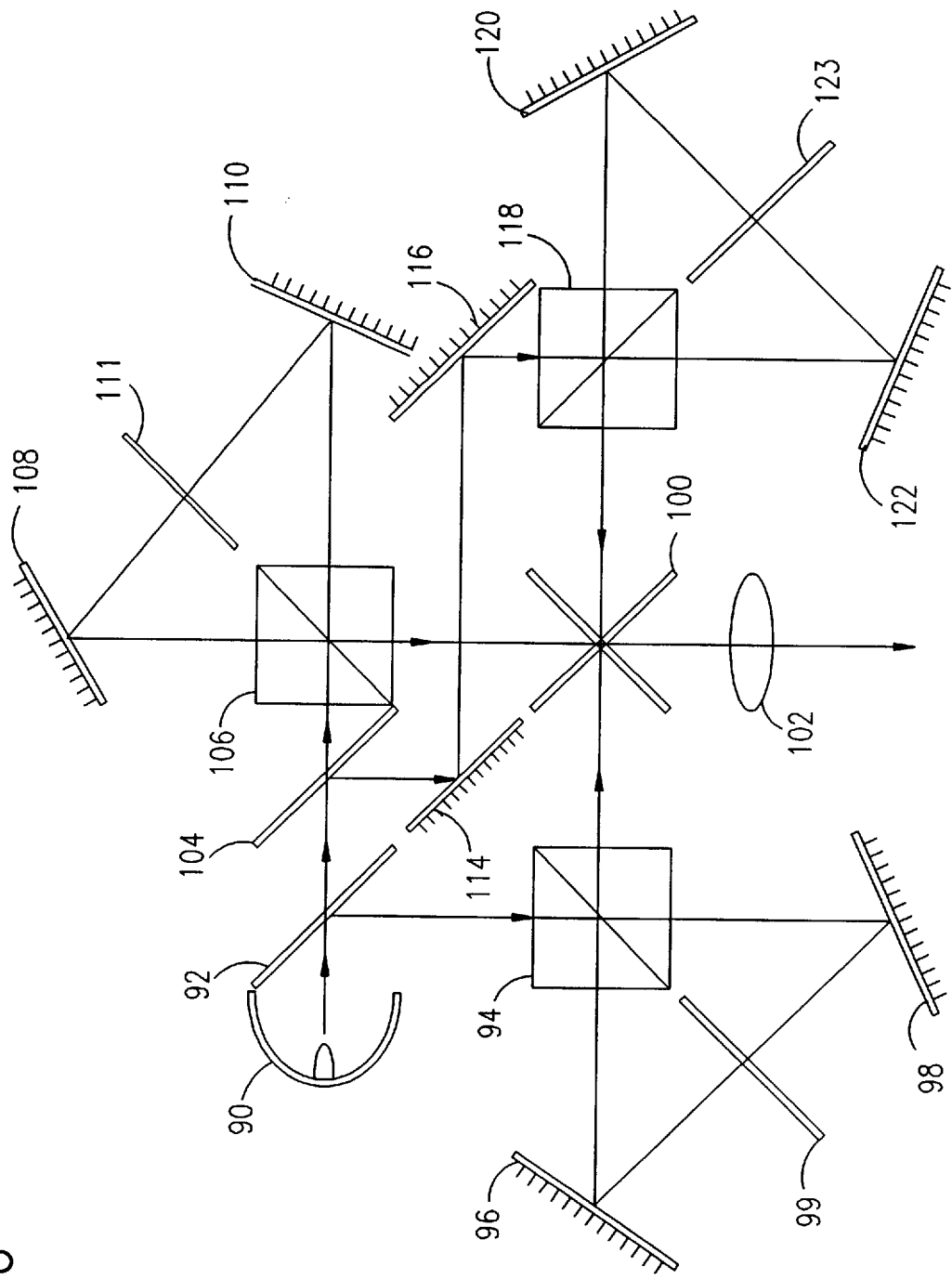
FIG. 6 is a simplified schematic illustration of a color projector employing three monochromatic subassemblies in accordance with yet another alternative embodiment of the present invention.

Reference is now made to FIG. 6, which illustrates a color projector employing three monochromatic subassemblies in accordance with yet another alternative embodiment of the present invention. Here a light source 90 emits a light beam which impinges on a dichroic beam splitter 92. Blue light reflected therefrom impinges on a polarizing beam splitter 94. The resulting two mutually orthogonally polarized components of the blue light are directed by respective mirrors 96 and 98 via a light valve array 99 and via polarizing beam splitter 94 which directs them to a dichroic beam combiner 100. Beam combiner 100 directs the blue light through an objective lens 102.

The red and green components are transmitted through dichroic beam splitter 92 and impinge on a further dichroic beam splitter 104. The green component is transmitted therethrough and impinges on a polarizing beam splitter 106. The resulting two mutually orthogonally polarized components of the green light are directed by respective mirrors 108 and 110 via a light valve array 111 and via polarizing beam splitter 106 which directs them to dichroic beam combiner 100, which transmit the green light through objective lens 102.

The red component is reflected by the dichroic beam splitter 104 onto a mirror 114 which directs it to a mirror 116, which reflects it onto a polarizing beam splitter 118. The resulting two mutually orthogonally polarized components of the red light are directed by respective mirrors 120 and 122 via a light valve array 123 and via polarizing beam splitter 118 which directs them to dichroic beam combiner 100, which directs the red light through objective lens 102.

Figure 7:
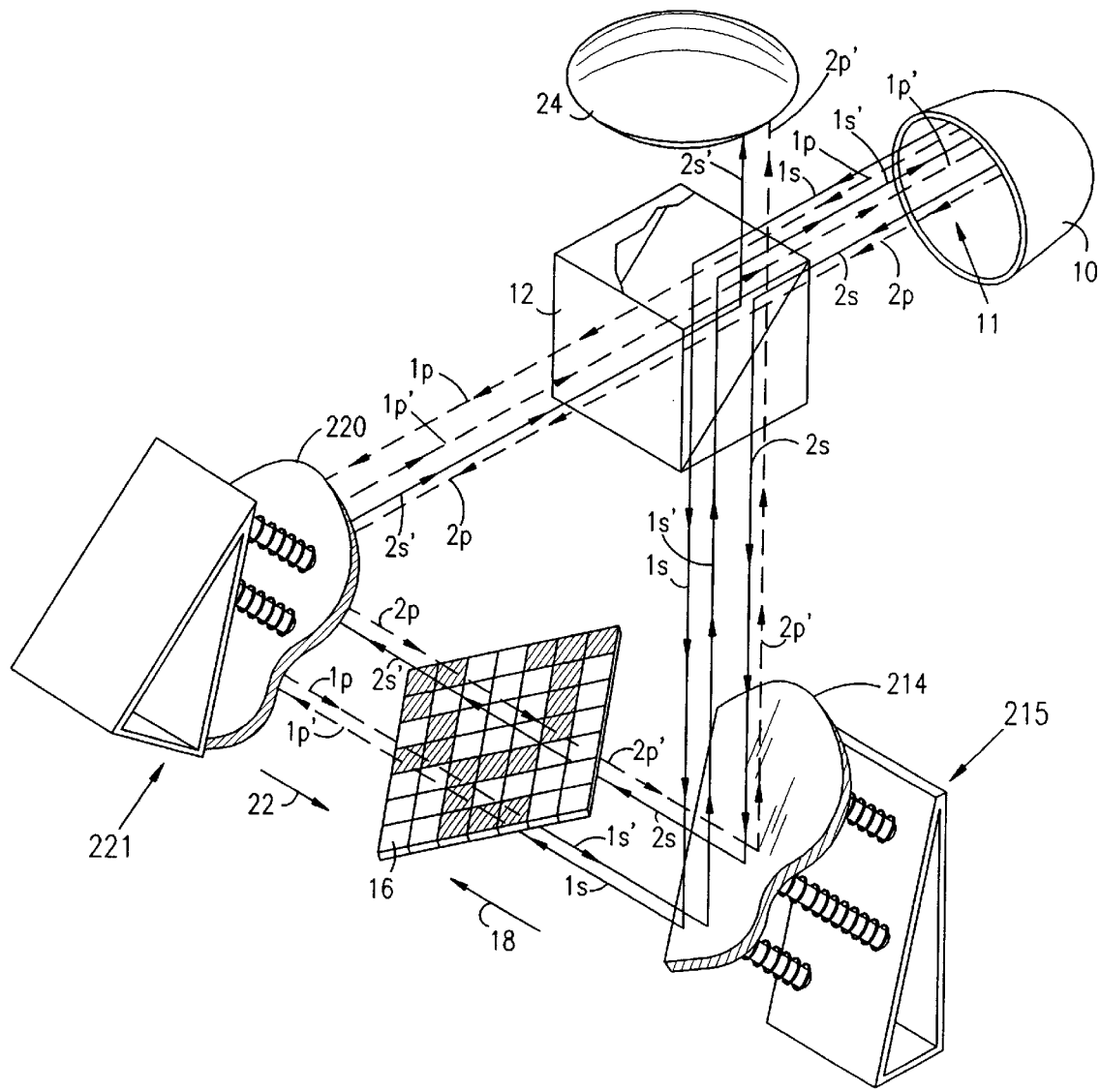
FIG. 7 is a simplified schematic illustration of a projector constructed and operative in accordance with another preferred embodiment of the present invention.

Reference is now made to FIG. 7, which illustrates a projector constructed and operative in accordance with another preferred embodiment of the present invention. The projector of FIG. 7 may be identical to that of FIG. 1, with the additional feature that one or both of mirrors 214 and 220 may be adjustably positionable, dynamically or statically by alignment apparatus 221 and 215 respectively. The remaining elements of the structure are indicated by identical reference numerals.

By using the adjustably positionable mirror or mirrors 214 and 220 one may cause two slightly mutually translated images of a pattern on the light valve array 16 to be projected via objective lens 24. This may produce depixelization of the resulting image, which is desirable in certain applications, such as video displays.

Figure 8:
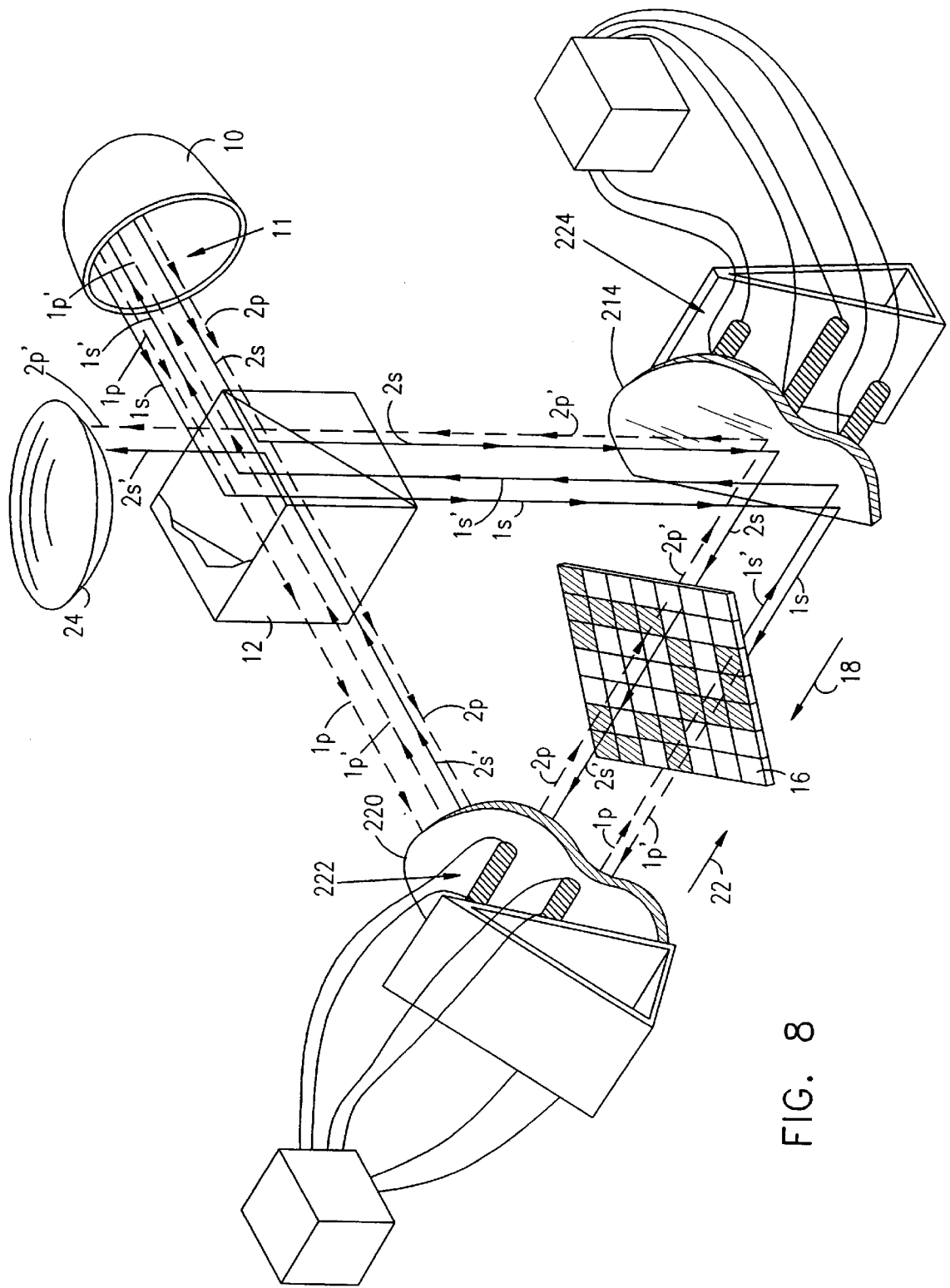
FIG. 8 is a simplified schematic illustration of a projector constructed and operative in accordance with yet another preferred embodiment of the present invention.

FIG. 8 illustrates the apparatus of FIG. 7 with the addition of apparatus for dynamically varying the position of mirrors 214 and 220. This apparatus may include, for example, piezoelectric assemblies 222 and 224, as illustrated in FIG. 8. By using the apparatus of FIG. 8, one may produce interlaced image fields and thus achieve enhanced image resolution, which may double or triple the number of rows per image without adding additional resolution requirements to the remainder of the apparatus, provided that the frame rate of the light valve array 16 is sufficiently high.

Figure 9:
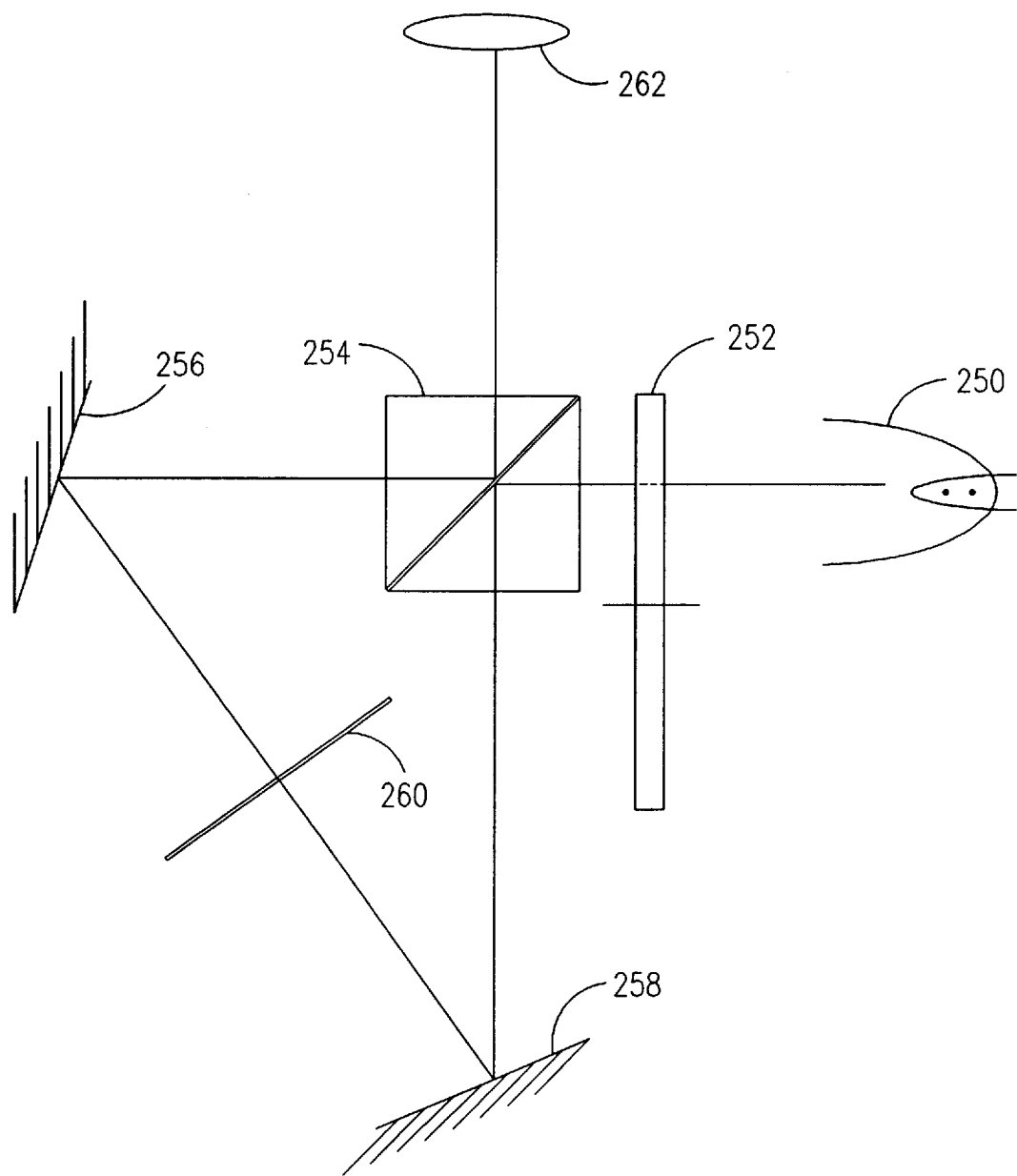
FIG. 9 is a simplified schematic illustration of a color projector constructed and operative in accordance with still another preferred embodiment of the present invention.

Reference is now made to FIG. 9, which illustrates a color projector constructed and operative in accordance with a preferred embodiment of the present invention. A light source 250 projects a beam of light via a color wheel 252 or any other suitable device for sequentially transmitting the R, G and B spectral components of the beam, onto a polarizing beam splitter 254. The resulting two mutually orthogonally polarized components of the R, G and B spectral components are directed by respective mirrors 256 and 258 via a light valve array 260 and via polarizing beam splitter 254 which directs them through an objective lens 262.

Figure 10:
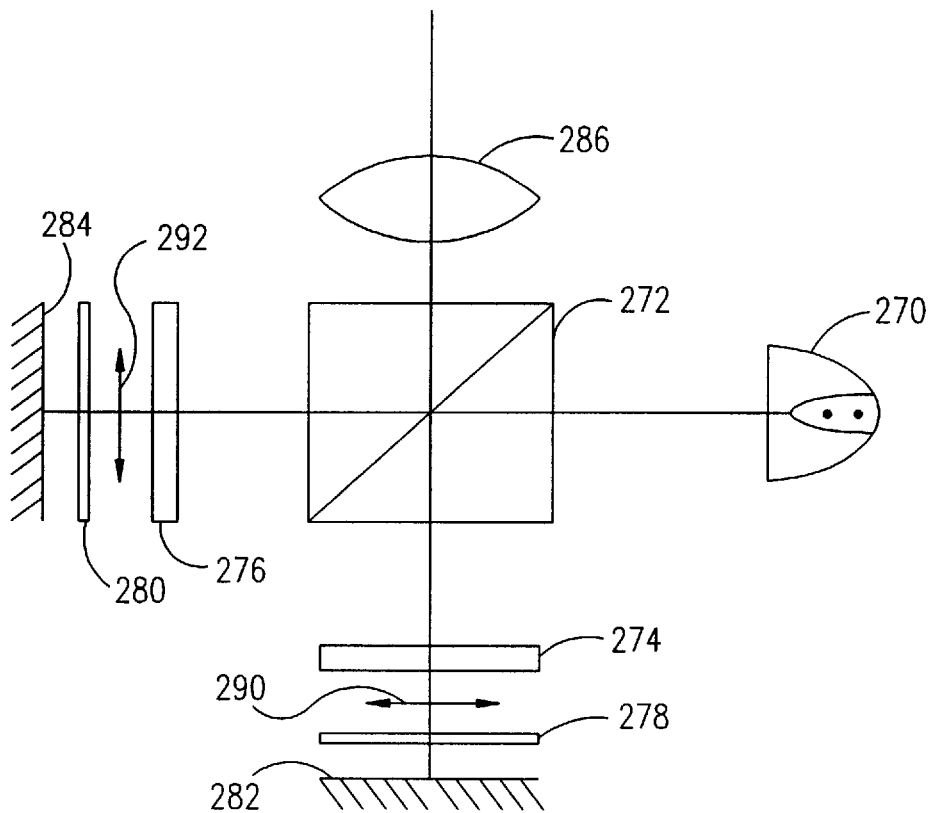
FIG. 10 is an illustration of a projector employing two light valve array sin a reflective mode in accordance with one embodiment of the present invention.

Reference is now made to FIG. 10, which illustrates a projector employing two light valve arrays in a reflective mode. Light from a light source 270 impinges on a polarizing beam splitter 272. The resulting two mutually orthogonally polarized components of the light are directed via two separate light valve arrays 274 and 276 and respective quarter wave plates 278 and 280 to respective mirrors 282 and 284. The light is reflected back via respective quarter wave plates 278 and 280 and light valve arrays 274 and 276 to polarizing beam splitter 272 and is directed thereby through an objective lens 286.

The light valve arrays 274 and 276 both operate in a reflective mode. It is noted that the light valve arrays 274 and 276 do not include polarizers.

As in the embodiments of FIGS. 7 and 8, by slightly translating either of the light valve arrays 274 and 276 along respective arrows 290 and 292 or perpendicularly thereto in the same plane one may cause two slightly mutually translated superimposed images of patterns on the light valve arrays to be projected via objective lens 286. When identical images appear on both light valve arrays 274 and 276, this may produce depixelization of the resulting image, which is desirable in certain applications, such as video displays. When different fields appear on the two light valve arrays, doubled image resolution in both mutually orthogonal directions may result.

By translating one or both of the light valve arrays 274 and 276 dynamically, analogously to the embodiment of FIG. 8, even greater increases in resolution can be achieved.

It is appreciated that in all of the embodiments employing two light valve arrays, the light valve arrays should be placed optically equidistant from the objective lens.

Figure 11:
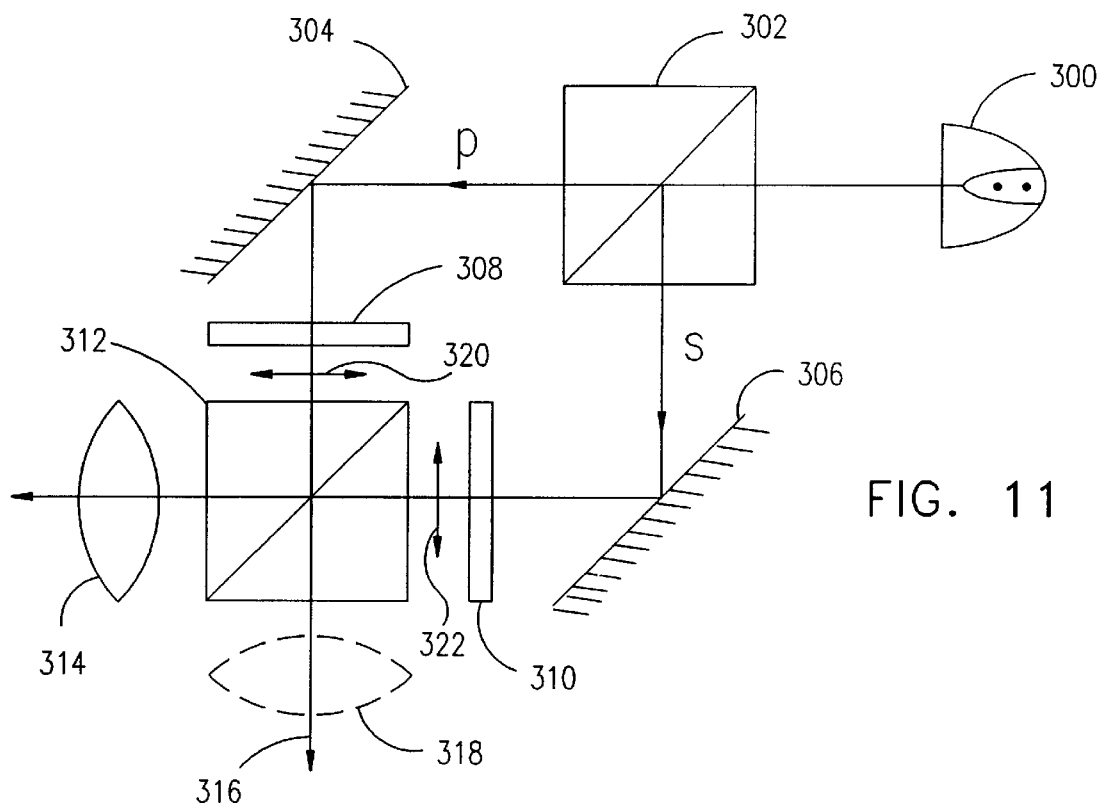
FIG. 11 is an illustration of a projector employing two light valve arrays in accordance with another embodiment of the present invention.

Reference is now made to FIG. 11, which is an illustration of a projector employing two light valve arrays in accordance with another embodiment of the present invention.

Light from a light source 300 impinges on a polarizing beam splitter 302. The resulting two mutually orthogonally polarized components of the light p and s are directed via two separate mirrors 304 and 306 and respective light valve arrays 308 and 310 to a polarizing beam splitter 312.

When a voltage is not applied to light valve arrays 308 and 310, all of the light impinging on polarizing beam splitter 312 is directed to an objective lens 314, for operation in a normally white mode. When a voltage is applied to light valve arrays 308 and 310, some or all of the light impinging on polarizing beam splitter 312 is directed in a direction indicated by an arrow 316. If it is desired to operate in a normally black mode, an objective lens 318 may be provided to focus light directed along arrow 316 and to provide an image thereof.

As in the embodiments of FIGS. 7 and 8, by slightly translating either of the light valve arrays 308 and 310 along respective arrows 320 and 322 or perpendicularly thereto in the same plane, one may cause two slightly mutually translated superimposed images of patterns on the light valve arrays to be projected via the objective lens. When identical images appear on both light valve arrays 308 and 310, this may produce depixelization of the resulting image, which is desirable in certain applications, such as video displays. When different fields appear on the two light valve arrays, doubled image resolution in both mutually orthogonal directions may result.

By translating one or both of the light valve arrays 308 and 310 dynamically, analogously to the embodiment of FIG. 8, even greater increases in resolution can be achieved.

It is appreciated that light valve arrays 308 and 310 may be monochromatic or polychromatic. Where the light valve arrays 308 or 310 are monochromatic, a polychromatic projector may be realized by combining suitably filtered light passing through three parallel devices of the type illustrated in FIG. 11.

Figure 12:
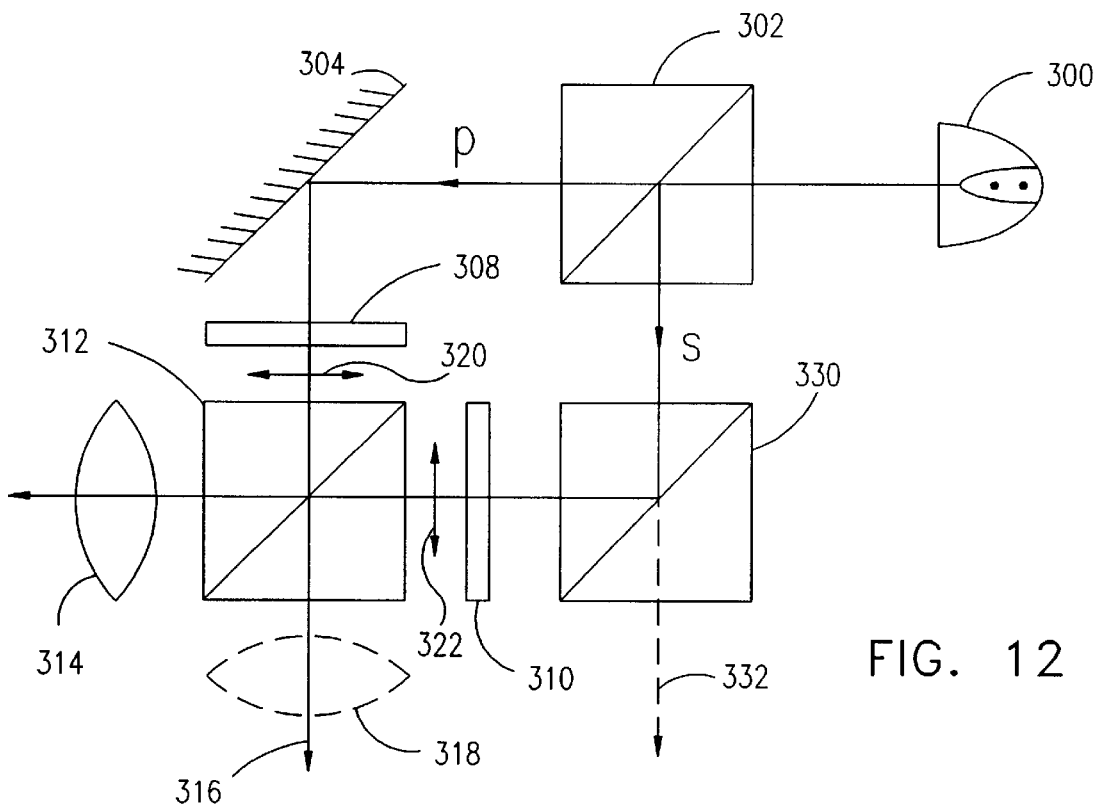
FIG. 12 is an illustration of a projector employing two light valve arrays in accordance with yet another embodiment of the present invention, which provides enhanced contrast.

Reference is now made to FIG. 12, which is an illustration of a projector employing two light valve arrays in accordance with yet another embodiment of the present invention, which provides enhanced contrast. The embodiment of FIG. 12 may be identical to that of FIG. 11 and identical elements are shown by the same reference numerals, with the following exception:

Mirror 306 is replaced by a polarizing beam splitter 330 which directs the s polarized component via light valve array 310 as in the embodiment of FIG. 11. In accordance with a preferred embodiment of the invention, the polarizing beam splitter 330 is also effective to filter out a residual p component which impinges thereon together with the s component, and directs it in a direction indicated by an arrow 332, thus removing it from the system and thus enhancing contrast.

Figure 13:
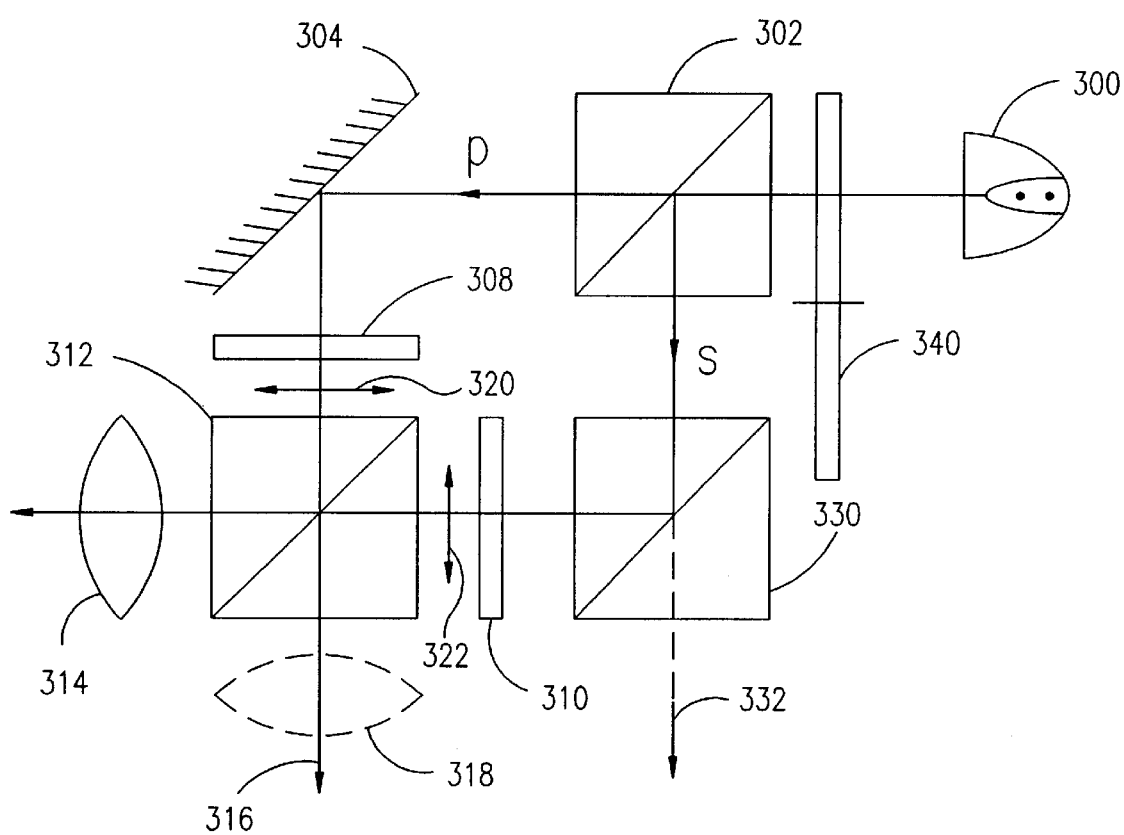
FIG. 13 is an illustration of a color projector employing two light valve arrays in accordance with still another embodiment of the present invention, which provides enhanced contrast.

Reference is now made to FIG. 13, which is an illustration of a color projector employing two light valve arrays in accordance with still another embodiment of the present invention, which provides enhanced contrast. The embodiment of FIG. 13 may be identical to that of FIG. 12 and identical elements are shown by the same reference numerals, with the following exception:

A color wheel 340 or any other suitable device for sequentially transmitting the R, G and B spectral components of the beam is located intermediate the light source 300 and the polarizing beam splitter 302. This arrangement can be employed with particular utility when the light valve arrays 308 and 310 are monochromatic, for providing a color projector.

Figure 14:
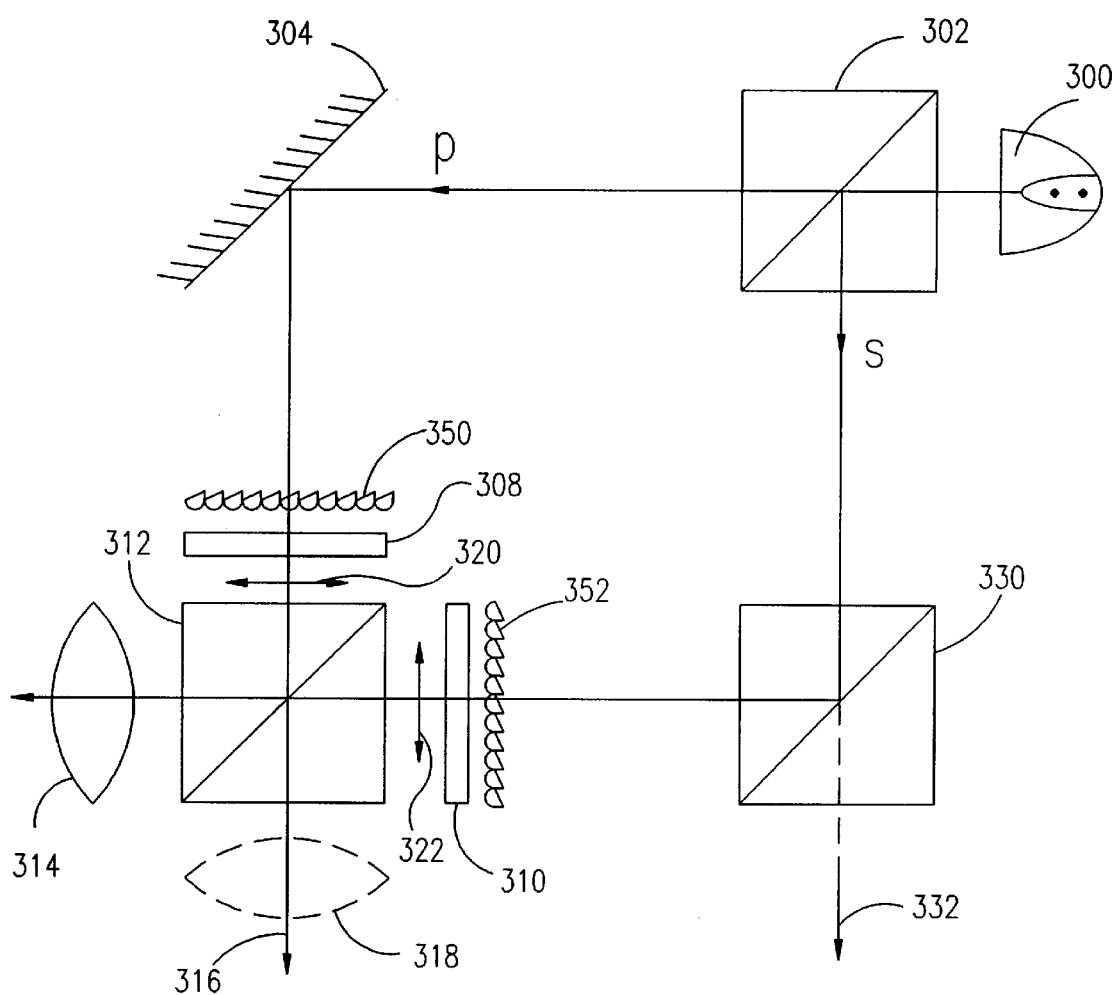
FIG. 14 is an illustration of a color projector employing two light valve arrays in accordance with a further embodiment of the present invention, which provides enhanced contrast.

Reference is now made to FIG. 14, which is an illustration of a color projector employing two light valve arrays in accordance with a further embodiment of the present invention, which provides enhanced contrast. The embodiment of FIG. 14 may be identical to that of FIG. 12 and identical elements are shown by the same reference numerals, with the following exception:

In order to provide greatly enhanced light utilization at the light valves 308 and 310, prism/lens combination arrays 350 and 352 are disposed upstream of respective light valve arrays 308 and 310. The prism/lens combination arrays 350 and 352 may be of the type described and claimed in applicant/assignee's U.S. patent application Ser. No. 08/262,624, now U.S. Pat. No. 5,617,152.

Figure 15:
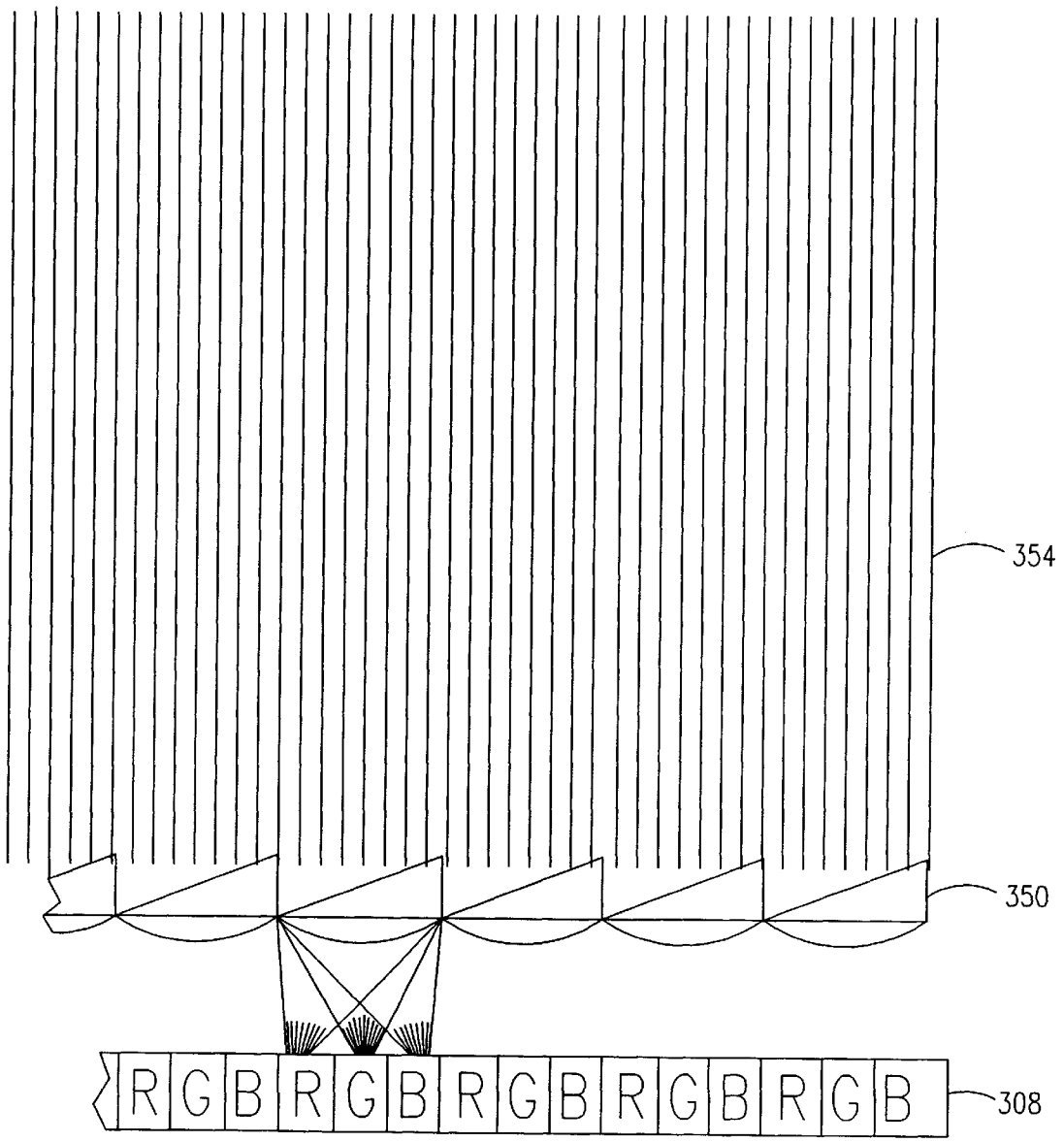
FIG. 15 is an illustration of the operation of part of the apparatus of FIG. 14.

As seen in FIG. 15, each component of an incoming collimated ray of light 354 is broken down by the prism/lens array 350 into bands of different colors, each of which passes through a separate pixel in light valve 308. This arrangement has substantial benefits in terms of light utilization efficiency as described in applicant/assignee's U.S. patent application Ser. No. 08/262,624, now U.S. Pat. No. 5,617,152, the disclosure of which is hereby incorporated by reference.

Figure 16:
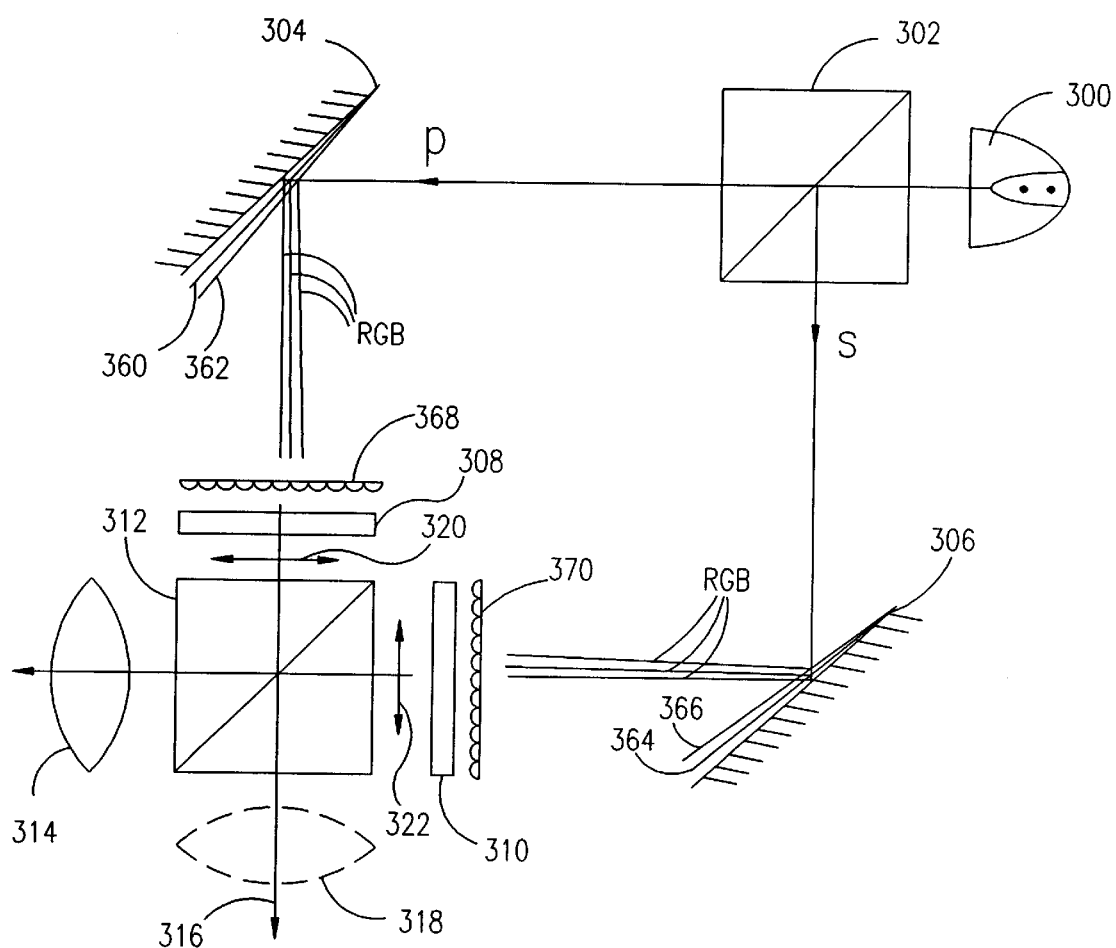
FIG. 16 is an illustration of a color projector employing two light valve arrays in accordance with a still further embodiment of the present invention.

Reference is now made to FIG. 16, which is an illustration of a color projector employing two light valve arrays in accordance with still another embodiment of the present invention. The embodiment of FIG. 16 may be identical to that of FIG. 11 and identical elements are shown by the same reference numerals, with the following exception:

In order to provide greatly enhanced light utilization at the light valves 308 and 310, there are provided in front of mirror 304 a pair of slightly tilted dichroic reflectors 360 and 362. Mirror 304 and dichroic reflectors 360 and 362 are together operative to provide a fan of the separate R, G and B components of light, each component being angularly separated from the other.

Similarly, there are provided in front of mirror 306 a pair of slightly tilted dichroic reflectors 364 and 366. Mirror 306 and dichroic reflectors 364 and 366 are together operative to provide a fan of the separate R, G and B components of light, each component being angularly separated from the other.

The three mutually angularly separated components R, G and B impinge on respective lens arrays 368 and 370, which are disposed upstream of respective light valve arrays 308 and 310.

Figure 17:
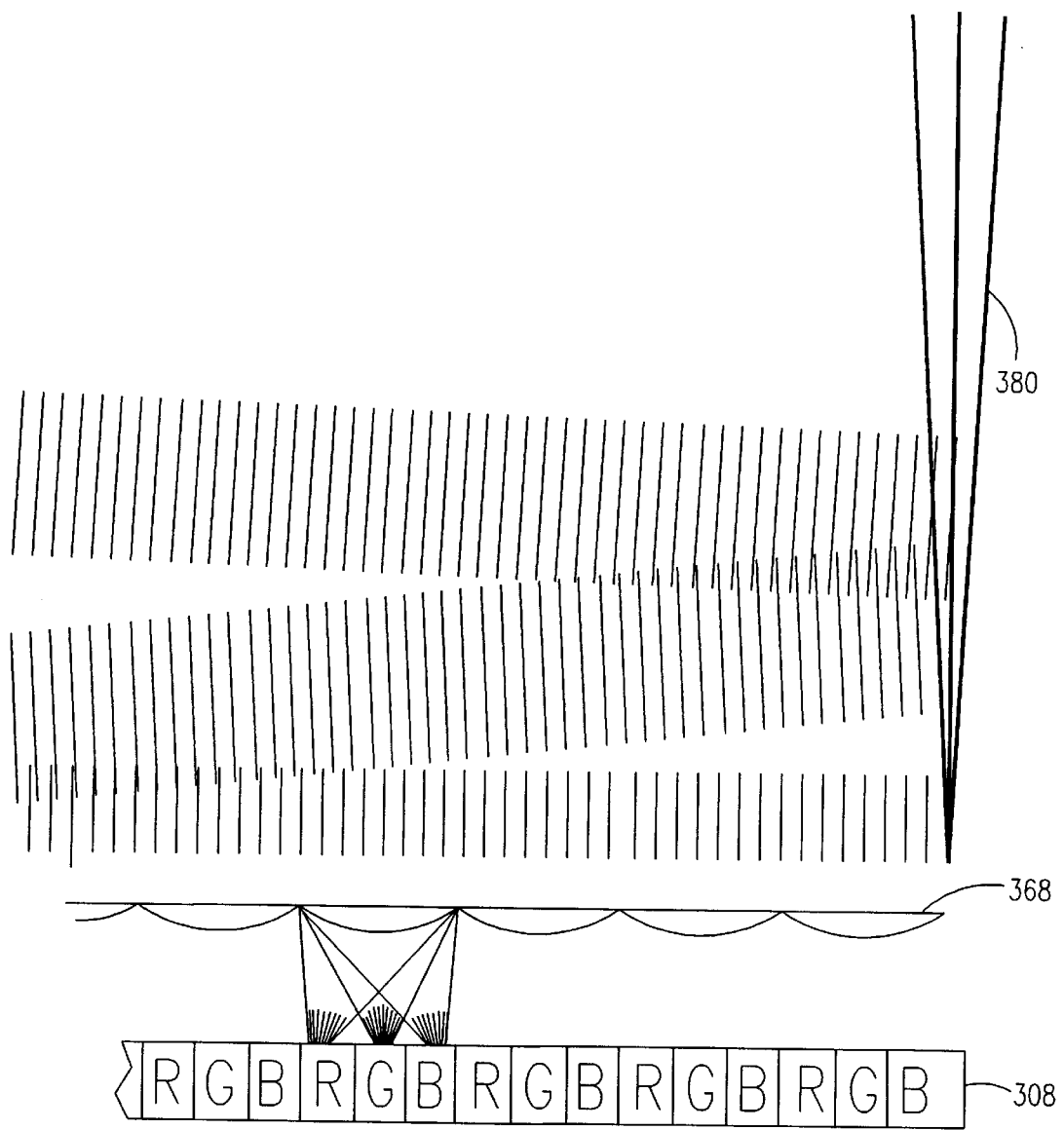
FIG. 17 is an illustration of the operation of part of the apparatus of FIG. 16.

As seen in FIG. 17, each of the R, G and B components of an incoming collimated ray of light 380 is focused by the lens array 368 through a separate pixel in light valve 308. This arrangement has substantial benefits in terms of light utilization efficiency as described in applicant/assignee's U.S. patent application Ser. No. 08/262,624, now U.S. Pat. No. 5,617,152, the disclosure of which is hereby incorporated by reference.

It is appreciated that for simplicity and conciseness of description, not all of the standard components of a projector have been specifically described herein. These components include IR and UV filters and fresnel lenses. It is to be understood that all conventional components of a projector are assumed to be included in the projectors of the present invention even though they are not specifically mentioned herein.

It will be appreciated by persons skilled in the art that the present invention is not limited by what has been particularly shown and described hereinabove. Rather the scope of the present invention is defined only by the claims which follow:

I claim:

1. A projector comprising:

a non-polarized light source;

a pair of polarizing beam splitters receiving light from said non-polarized light source;

an additional beam splitter operative to filter out unwanted residual polarized light thereby enhancing contrast; and a pair of selectably actuable polarization rotating light valves having impinging thereon light from the polarizing beam-splitter which is polarized in a different sense, and wherein said pair of polarizing beam splitters includes first and second polarizing beam-splitters, said second polarizing beam splitter receiving light split from the first polarizing beam-splitter and said pair of selectably actuable polarization rotating light valves includes first and second selectably actuable polarization rotating light valves.

2. A projector according to claim 1 and wherein said light valves are monochromatic and also including a device for sequentially transmitting the R, G and B spectral components of the beam, onto at least one polarizing beam splitter.

3. A projector comprising:

a non-polarized light source;

a pair of polarizing beam splitters receiving light from said non-polarized light source;

a pair of selectably actuable polarization rotating light valves having impinging thereon light from the polarizing beam-splitter which is polarized in a different sense; and prism/lens combination arrays disposed upstream of said light valves;

and wherein said pair of polarizing beam splitters includes first and second polarizing beam-splitters, said second polarizing beam splitter receiving light split from the first polarizing beam-splitter and said pair of selectably actuable polarization rotating light valves includes first and second selectably actuable polarization rotating light valves.

4. A projector comprising:

a non-polarized light source;

a pair of polarizing beam splitters receiving light from said non-polarized light source;

a pair of selectably actuable polarization rotating light valves having impinging thereon light from the polarizing beam-splitter which is polarized in a different sense; and lens combination arrays disposed upstream of said light valves;

and wherein said pair of polarizing beam splitters includes first and second polarizing beam-splitters, said second polarizing beam splitter receiving light split from the first polarizing beam-splitter and said pair of selectably actuable polarization rotating light valves includes first and second selectably actuable polarization rotating light valves.

5. A projector comprising:

a non-polarized light source;

a pair of polarizing beam splitters receiving light from said non-polarized light source;

a pair of selectably actuable polarization rotating light valves having impinging thereon light from the polarizing beam-splitter which is polarized in a different sense; and apparatus for providing depixilization;

and wherein said pair of polarizing beam splitters includes first and second polarizing beam-splitters, said second polarizing beam splitter receiving light split from the first polarizing beam-splitter and said pair of selectably actuable polarization rotating light valves includes first and second selectably actuable polarization rotating light valves.

6. A projector comprising:

a non-polarized light source;

a pair of polarizing beam splitters receiving light from said non-polarized light source;

a pair of selectably actuable polarization rotating light valves having impinging thereon light from the polarizing beam-splitter which is polarized in a different sense; and apparatus for providing interlaced images with enhanced resolution;

and wherein said pair of polarizing beam splitters includes first and second polarizing beam-splitters, said second polarizing beam splitter receiving light split from the first polarizing beam-splitter and said pair of selectably actuable polarization rotating light valves includes first and second selectably actuable polarization rotating light valves.

7. A projector comprising:

a non-polarized light source;

at least one polarizing beam-splitter receiving light from said non-polarized light source; and a pair of selectably actuable polarization rotating light valves having impinging thereon light from the polarizing beam-splitter, wherein the pair of selectably actuable polarization rotating light valves operate in a reflective mode.

* * * * *